United States Patent
Molaire et al.

(10) Patent No.: US 7,033,716 B2
(45) Date of Patent: *Apr. 25, 2006

(54) TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME

(75) Inventors: Michel F. Molaire, Rochester, NY (US); Jeanne E. Kaeding, Rochester, NY (US); Theodore Zubil, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 10/655,388

(22) Filed: Sep. 4, 2003

(65) Prior Publication Data

US 2004/0106053 A1   Jun. 3, 2004

Related U.S. Application Data

(60) Provisional application No. 60/430,923, filed on Dec. 4, 2002, provisional application No. 60/430,219, filed on Dec. 2, 2002, provisional application No. 60/430,779, filed on Dec. 4, 2002, provisional application No. 60/430,777, filed on Dec. 4, 2002.

(51) Int. Cl.
  *G03G 15/02* (2006.01)
  *C09B 67/04* (2006.01)
(52) U.S. Cl. ........................ 430/59.5; 430/78; 540/141
(58) Field of Classification Search ............... 430/59.5, 430/78; 540/141
  See application file for complete search history.

(56) References Cited

U.S. PATENT DOCUMENTS

| | | | |
|---|---|---|---|
| 3,589,924 A | 6/1971 | Giambalvo et al. | 106/288 Q |
| 4,555,467 A | 11/1985 | Hasegawa et al. | 430/110 |
| 4,701,396 A | 10/1987 | Hung et al. | 430/58 |
| 4,785,999 A | 11/1988 | Takijiri | 241/26 |
| 4,882,427 A | 11/1989 | Enokida et al. | 540/141 |
| 4,994,566 A | 2/1991 | Mimura et al. | 540/141 |
| 5,008,173 A | 4/1991 | Mimura et al. | 430/78 |
| 5,039,586 A | 8/1991 | Itami et al. | 430/78 |
| 5,055,368 A | 10/1991 | Nguyen et al. | 430/78 |
| 5,059,355 A | 10/1991 | Ono et al. | 252/584 |
| 5,112,711 A | 5/1992 | Nguyen et al. | 430/58 |
| 5,132,197 A | 7/1992 | Iuchi et al. | 430/76 |
| 5,166,339 A | 11/1992 | Duff et al. | 540/141 |
| 5,194,354 A | 3/1993 | Takai et al. | 430/58 |
| 5,206,359 A | 4/1993 | Mayo et al. | 540/141 |
| 5,238,764 A | 8/1993 | Molaire et al. | 430/58 |
| 5,238,766 A | 8/1993 | Molaire et al. | 430/78 |
| 5,523,189 A | 6/1996 | Molaire | 430/58 |
| 5,614,342 A | 3/1997 | Molaire et al. | 430/78 |
| 5,629,418 A | 5/1997 | Molaire et al. | 540/141 |
| 5,753,395 A * | 5/1998 | Kinoshita et al. | 430/78 |
| 5,766,810 A | 6/1998 | Molaire et al. | 430/78 |
| 5,773,181 A | 6/1998 | Molaire et al. | 430/78 |

* cited by examiner

*Primary Examiner*—John L Goodrow
(74) *Attorney, Agent, or Firm*—Carl F. Ruoff

(57) ABSTRACT

An amorphous mixture consisting essentially of TiOFPc and TiOPc and containing more than 75 weight percent of substantially chlorine-free TiOPc is produced by forming a mixture of crude crystalline TiOFPc and crude crystalline, substantially chlorine-free TiOPc that contains less than 80 weight percent TiOPc, treating the mixture under conditions effective to form a substantially amorphous mixture of TiOFPc and TiOPc containing less than 75 weight percent TiOPc, which is then treated with water, and dried. A further amount of crude crystalline, substantially chlorine-free TiOPc sufficient to form a new mixture containing more than 75 weight percent of substantially chlorine-free TiOPc is added, and the new mixture is converted to a substantially amorphous mixture of TiOFPc and TiOPc. A nanoparticulate cocrystalline composition is obtained by forming a slurry in an organic solvent of the dried substantially amorphous mixture, and wet milling the slurry to form the cocrystalline composition.

13 Claims, 7 Drawing Sheets

TWO-STAGE MILLING PROCESS FOR PREPARING COCRYSTALS OF TITANYL FLUOROPHTHALOCYANINE AND TITANYL PHTHALOCYANINE, AND ELECTROPHOTOGRAPHIC ELEMENT CONTAINING SAME

CROSS-REFERENCE TO RELATED APPLICATIONS

Reference is made to the following co-pending, commonly-assigned applications, the disclosures of which are incorporated herein by reference:

U.S. Provisional Patent Application Ser. No. 60/430,923, filed Dec. 4, 2002, in the names of Molaire, et al., entitled SELF-DISPERSING TITANYL PHTHALOCYANINE PIGMENT COMPOSITIONS AND ELECTROPHOTOGRAPHIC CHARGE GENERATION LAYERS CONTAINING SAME;

U.S. Provisional Patent Application Ser. No. 60/430,219, filed Dec. 2, 2002, in the name of Molaire, entitled UNIFORM COCRYSTALS OF TITANYL FLUOROPHTHALOCYANINE AND TITANYL PHTHALOCYANINE FORMED IN TRICHLOROETHANE, AND CHARGE GENERATING LAYER CONTAINING SAME;

U.S. Provisional Patent Application Ser. No. 60/430,779, filed Dec. 4, 2002, in the names of Molaire, et al., entitled COCRYSTALS CONTAINING HIGH-CHLORINE TITANYL PHTHALOCYANINE AND LOW CONCENTRATION OF TITANYL FLUOROPHTHALOCYANINE, AND ELECTROPHOTOGRAPHIC ELEMENT CONTAINING SAME;

U.S. Provisional Patent Application Ser. No. 60/430,777, filed Dec. 4, 2002, in the names of Molaire, et al., entitled PROCESS FOR FORMING COCRYSTALS CONTAINING CHLORINE-FREE TITANYL PHTHALOCYANINES AND LOW CONCENTRATION OF TITANYL FLUOROPHTHALOCYANINE USING ORGANIC MILLING AID.

FIELD OF THE INVENTION

The present invention relates to electrophotographic elements and related materials. More particularly, the invention relates to a process for amorphizing highly crystalline mixtures of titanyl phthalocyanine (TiOPc) and titanyl tetrafluorophthalocyanine (TiOFPc) pigments containing a high concentration of TiOPc and converting the amorphous mixtures to nanoparticulate cocrystalline compositions.

BACKGROUND OF THE INVENTION

In electrophotography, an image comprising a pattern of electrostatic potential, also referred to as an electrostatic latent image, is formed on a surface of an electrophotographic element comprising at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials that have been employed in electrophotographic elements are phthalocyanine pigments such as titanyl phthalocyanine and titanyl tetrafluorophthalocyanines. Electrophotographic recording elements containing such pigments as charge-generation materials are useful in electrophotographic laser beam printers because of their capability for providing good photosensitivity in the near infrared region of the electromagnetic spectrum, that is, in the range of 700–900 nm.

Flocculation of organic pigment dispersions has been a recognized problem, especially in the paint and coating industry, for some time. For example, U.S. Pat. No. 3,589,924, in the names of Giambalvo, et al., describes improved non-crystallizing, non-flocculating phthalocyanine pigment compositions formed by mixing 60–95% of a crystallization-or flocculation-susceptible phthalocyanine pigment with about 5–40% of a sulfonated phthalimidomethyl phthalocyanine derivative. The mixture is prepared by the usual methods, e.g., acid pasting or salt grinding, for converting the phthalocyanine materials to pigmentary size. However, techniques that are designed primarily to provide suitable pigments for paints and industrial coatings may not yield materials of sufficient purity or the appropriate crystallinity characteristics to meet the stringent requirements of electrophotographic applications, where high purity is very important for ensuring reliable performance. The crystalline form of the final pigment also has a profound influence on the performance of an electrophotographic element containing it.

In a photoconductive layer produced from a liquid coating composition that includes the titanyl phthalocyanine pigment and a solvent solution of polymeric binder, it is necessary that the titanyl phthalocyanine pigment be in a highly photoconductive form, either crystalline or amorphous, and in a sufficiently stable dispersion to permit its application as a very thin layer having high electrophotographic speed in the near infrared region.

A variety of methods have been used to produce suitable forms of titanyl phthalocyanine having differing crystallographic characteristics. U.S. Pat. No. 5,166,339 in the names of Duff, et al., presents a table of polymorphs of unsubstituted titanyl phthalocyanine in which materials bearing multiple designations are grouped as four types. Many phthalocyanine pigments are discussed in P. M. Borsenberger and D. S. Weiss, *Organic Photoreceptors for Imaging Systems*, Marcel Dekker, Inc., New York, pp.338–391.

In one type of preparation, commonly referred to as "acid-pasting", crude titanyl phthalocyanine is dissolved in an acid solution, which is then diluted with a non-solvent to precipitate the titanyl phthalocyanine product. In another type of procedure, the crude titanyl phthalocyanine is milled, generally with particular milling media. Additionally, some preparations include a combination of techniques or modify a previously prepared titanyl phthalocyanine.

U.S. Pat. No. 5,132,197 in the names of Iuchi, et al., teaches a method in which titanyl phthalocyanine is acid pasted, treated with methanol, and milled with ether, monoterpene hydrocarbon, or liquid paraffin to produce a titanyl phthalocyanine having main peaks of the Bragg angle 2Θ with respect to X-rays of Cu Kα at 9.0°, 14.2°, 23.9°, and 27.1° (all +/−0.2°).

U.S. Pat. No. 5,206,359 in the names of Mayo, et al., teaches a process in which titanyl phthalocyanine produced by acid pasting is converted to type IV titanyl phthalocyanine from Type X by treatment with halobenzene.

U.S. Pat. No. 5,059,355 in the names of Ono, et al., teaches a process in which titanyl phthalocyanine is shaken with glass beads, producing an amorphous material having no substantial peaks detectable by X-ray diffraction. The amorphous material is stirred, with heating, in water and ortho-dichlorobenzene; methanol is added after cooling. A crystalline material having a distinct peak at 27.3° is produced.

U.S. Pat. No. 4,882,427 in the names of Enokida, et al., teaches a material having noncrystalline titanyl phthalocyanine and pseudo-non-crystalline titanyl phthalocyanine. The pseudo-noncrystalline material can be prepared by acid pasting or acid slurrying. The noncrystalline titanyl phthalocyanine can be prepared by acid pasting or acid slurrying followed by dry or wet milling, or by mechanical milling for a long time without chemical treatment.

U.S. Pat. No. 5,194,354 in the names of Takai, et al., teaches that amorphous titanyl phthalocyanine prepared by dry pulverization or acid pasting can be converted, by stirring in methanol, to a low crystalline titanyl phthalocyanine having strong peaks of the Bragg angle 2Θ with respect to X-rays of Cu Kα at 7.2°, 14.2°, 24.0°, and 27.2° (all +/−0.2°). It is stated that the low crystalline material can be treated with various organic solvents to produce crystalline materials: methyl cellosolve or ethylene glycol for material having strong peaks at 7.4°, 10.9°, and 17.9°; propylene glycol, 1,3-butanediol, or glycerine for material having strong peaks at 7.6°, 9.7°, 12.7°, 16.2°, and 26.4°; and aqueous mannitol solution for material having strong peaks at 8.5° and 10.2° (all peaks +/−0.2°).

U.S. Pat. Nos. 4,994,566 and 5,008,173 both in the names of Mimura, et al., teach a process in which non-crystalline particles produced by acid pasting or slurrying, followed by mechanical grinding or sublimation, are treated with tetrahydrofuran to produce a titanyl phthalocyanine having infrared absorption peaks at 1332, 1074, 962, and 783 cm$^{-1}$.

U.S. Pat. No. 5,039,586 in the name of Itami, teaches acid pasting, followed by milling in aromatic or haloaromatic solvent, with or without additional water or other solvents such as alcohols or ethers, at 20–100° C. In an example, crude titanyl phthalocyanine is milled with α-chloronaphthalene or ortho-dichlorobenzene as milling medium, followed by washing with acetone and methanol. The titanyl phthalocyanine produced has a first maximum intensity peak of the Bragg angle 2Θ with respect to X-rays of Cu Kα at a wavelength of 1.541 Å at 27.3° +/−0.2°, and a second maximum intensity peak at 6.8° +/−0.2°. This was contrasted with another titanyl phthalocyanine that is similarly milled, but not acid pasted. This material has a maximum peak at 27.3° +/−0.2° and a second maximum intensity peak at 7.5°+/−0.2°.

U.S. Pat. No. 5,055,368 in the names of Nguyen, et al., teaches a "salt-milling" procedure in which crude titanyl phthalocyanine is milled, first under moderate shearing conditions with milling media comprising inorganic salt and non-conducting particles. The milling is then continued at higher shear and temperatures up to 50° C., until the pigment undergoes a perceptible color change. Solvent is substantially absent during the milling steps.

U.S. Pat. No. 4,701,396 in the names of Hung, et al., teaches near infrared sensitive photoconductive elements made from fluorine-substituted titanylphthalocyanine pigments. While phthalocyanines having only fluorine substituents, and those being equal in number on each aromatic ring, are the preferred pigments of the invention described in that patent, various non-uniformly substituted phthalocyanines are taught.

U.S. Pat. No. 5,112,711 in the names of Nguyen, et al., teaches an electrophotographic element having a physical mixture of titanyl phthalocyanine crystals and titanyl fluorophthalocyanine crystals. The element provides a synergistic increase in photosensitivity in comparison to an expected additive combination of titanyl phthalocyanine and titanyl fluorophthalocyanine. Similar elements having physical mixtures combining titanyl phthalocyanine and chloro- or bromo-substituted titanyl phthalocyanine crystals produce results in which the photosensitivity is close to that of the least sensitive of the two phthalocyanines used.

U.S. Pat. Nos. 5,238,764 and 5,238,766, both in the names of Molaire, et al., teach that titanyl fluorophthalocyanine products of acid-pasting and salt-milling procedures, unlike unsubstituted titanyl phthalocyanine, suffer a significant reduction in near infrared sensitivity when they are dispersed in a solvent such as methanol or tetrahydrofuran, which has a $gamma_c$ hydrogen bonding parameter value greater than 9.0. These patents further teach that this reduction in sensitivity can be prevented by first contacting the titanyl fluorophthalocyanine with a material having a $gamma_c$ hydrogen bonding parameter of less than 8.0.

Molaire, et al., in U.S. Pat. No. 5,629,418, discloses a method for preparing titanyl fluorophthalocyanine that comprises the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed and contacting it with an organic solvent, which results in the conversion of the amorphous material to high crystallinity titanyl fluorophthalocyanine, the amorphous titanyl fluorophthalocyanine having been maintained in contact with water continuously from its precipitation to its conversion to a crystalline form.

The particle size distribution and stability of charge generation dispersions are very important for providing uniform charge generation layer in order to control generation of "breakdown spots" and minimize the granularity of prints. In U.S. Pat. Nos. 5,614,342 and 5,766,810, both in the names of Molaire and Kaeding, is disclosed a method for preparing cocrystals of titanyl fluorophthalocyanine and unsubstituted titanyl phthalocyanine that comprises the steps of: admixing crude titanyl phthalocyanine and crude titanyl fluorophthalocyanine to provide an amorphous pigment mixture, as determined by X-ray crystallography using X-radiation characteristic of Cu Kα at a wavelength of 1.541 Å of the Bragg angle 2Θ; contacting the amorphous pigment mixture with an organic solvent having a $gamma_c$ hydrogen bonding parameter of less than 8:0; and, prior to contacting, substantially excluding the amorphous pigment mixture from contact with an organic solvent having a $gamma_c$ hydrogen bonding parameter greater than 9.0. The amorphization step must be substantially complete so as to break the large primary particles of the starting crude pigments and thereby lower the average particle size of the final cocrystalline mixture. Substantially complete amorphization of the crude pigments is also necessary to prevent degradation of the dark decay characteristics of the final cocrystal; small amounts of crude pigments having inherently high dark decay that are not amorphized would not be affected by the subsequent solvent treatment and therefore would retain their high dark decay characteristics, causing degradation of the dark decay property of the final cocrystalline product.

Molaire, et al., in U.S. Pat. No. 5,523,189, discloses an electrophotographic element comprising a charge generation layer that includes a binder in which is dispersed a physical mixture of a high speed titanyl fluorophthalocyanine having a first intensity peak with respect to X-rays characteristic of Cu Kα at a wavelength of 1.541 Å of the Bragg angle 2Θ at 27° ±0.2°, and a second intensity peak at 7.3° ±0.2°, the second peak having an intensity relative to the first peak of less than 60 percent; and a low speed titanyl fluorophthalocyanine having a first intensity peak with respect to X-rays characteristic of Cu Kα at a wavelength of 1.541 Å of the Bragg angle 2 Θ at 6.7° ±0.2°, and a second intensity peak at 23° ±0.2°, the second peak having an intensity relative to the first peak of less than 50 percent.

Molaire, et al., in U.S. Pat. No. 5,773,181, discloses a method for preparing a phthalocyanine composition comprising the steps of: synthesizing a crystalline product comprising a mixture of five different unsubstituted or fluoro-substituted phthalocyanines, wherein a central M moiety bonded to the four inner nitrogen atoms of the phthalocyanine nuclei represents a pair of hydrogen atoms or a covalent or coordinate bonded moiety, including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb, with M preferably representing Ti=O; increasing the amorphous character of the mixture of phthalocyanines as determined by X-ray crystallography using X-radiation characteristic of Cu Kα at a wavelength of 1.541 Å of the Bragg angle 2Θ to provide an amorphous pigment mixture; contacting the amorphous pigment mixture with organic solvent having a gamma$_c$ hydrogen bonding parameter of less than 8.0; and prior to the contacting, substantially excluding the amorphous pigment mixture from contact with organic solvent having a gamma$_c$ hydrogen bonding parameter greater than 9.0.

The procedures for the preparation of titanyl phthalocyanine pigments described in the foregoing patents, all of whose disclosures are incorporated herein by reference, suffer from various deficiencies and disadvantages. For example, the use of acid presents a shortcoming for both environmental and safety concerns, particularly in commercial scale procedures. Also, salt milling avoids the use of acid but requires extensive washing of the milled material to remove salts, which can otherwise cause high dark decay in a photoconductor.

Procedures that first contact the titanyl fluorophthalocyanine with a solvent such as methanol or tetrahydrofuran that has a gamma$_c$ hydrogen bonding parameter value greater than 9.0 cause a significant reduction in near infrared sensitivity. The preparation of titanyl fluorophthalocyanine having good photogeneration characteristics is expensive. It would be desirable to be able to produce a crystalline titanyl phthalocyanine composition that has good photogeneration characteristics when used in an electrophotographic element but is less expensive than titanyl fluorophthalocyanine. A suitable procedure would avoid deleterious contact with high gamma$_c$ hydrogen bonding parameter solvents and also not require the use of acid or of salt milling media.

SUMMARY OF THE INVENTION

There is a need to provide a process of amorphizing highly crystalline TiOFPc-TiOPc mixtures containing a high concentration of substantially chlorine-free TiOPc. The present invention is directed to a process for forming an amorphous mixture consisting essentially of TiOFPc and TiOPc and containing more than 75 weight percent of substantially chlorine-free TiOPc. The process comprises: forming a mixture of crude crystalline TiOFPc and crude crystalline, substantially chlorine-free TiOPc that contains less than 75 weight percent TiOPc, treating the mixture under conditions effective to form a substantially amorphous mixture of TiOFPc and TiOPc containing less than 75 weight percent TiOPc, treating the substantially amorphous mixture with water, drying the mixture and adding a further amount of crude crystalline, substantially chlorine-free TiOPc sufficient to form a new mixture containing more than 75 weight percent of substantially chlorine-free TiOPc, and treating the new mixture under conditions effective to form a substantially amorphous mixture of TiOFPc and TiOPc containing more than 75 weight percent of substantially chlorine-free TiOPc.

Further, in accordance with the present invention, a nanoparticulate cocrystalline composition is obtained by forming a slurry in an organic solvent of a dried substantially amorphous mixture of TiOFPc and TiOPc, and wet milling the slurry to form a nanoparticulate cocrystalline composition consisting essentially of TiOFPc and TiOPc and containing more than 75 weight percent of substantially chlorine-free TiOPc.

BRIEF DESCRIPTION OF THE DRAWINGS

FIG. 1 shows an amorphized 60/40 TiOPc/TiOFPc mixture;

FIG. 2 shows an amorphized 90/10 TiOPc/TiOFPc mixture;

FIG. 3 shows a cocrystalline 90/10 TiOPc/TiOFPc mixture;

FIG. 4 shows a highly crystalline commercial TiOPc pigment;

FIG. 5 shows an amorphized 60/40 TiOPc/TiOFPc mixture formed using the highly crystalline commercial TiOPc pigment;

FIG. 6 shows an amorphized 90/10 TiOPc/TiOFPc mixture formed using the highly crystalline commercial TiOPc pigment; and FIG. 7 shows a cocrystalline 90/10 TiOPc/TiOFPc mixture formed using the highly crystalline commercial TiOPc pigment.

DETAILED DESCRIPTION OF THE INVENTION

Figure 1:
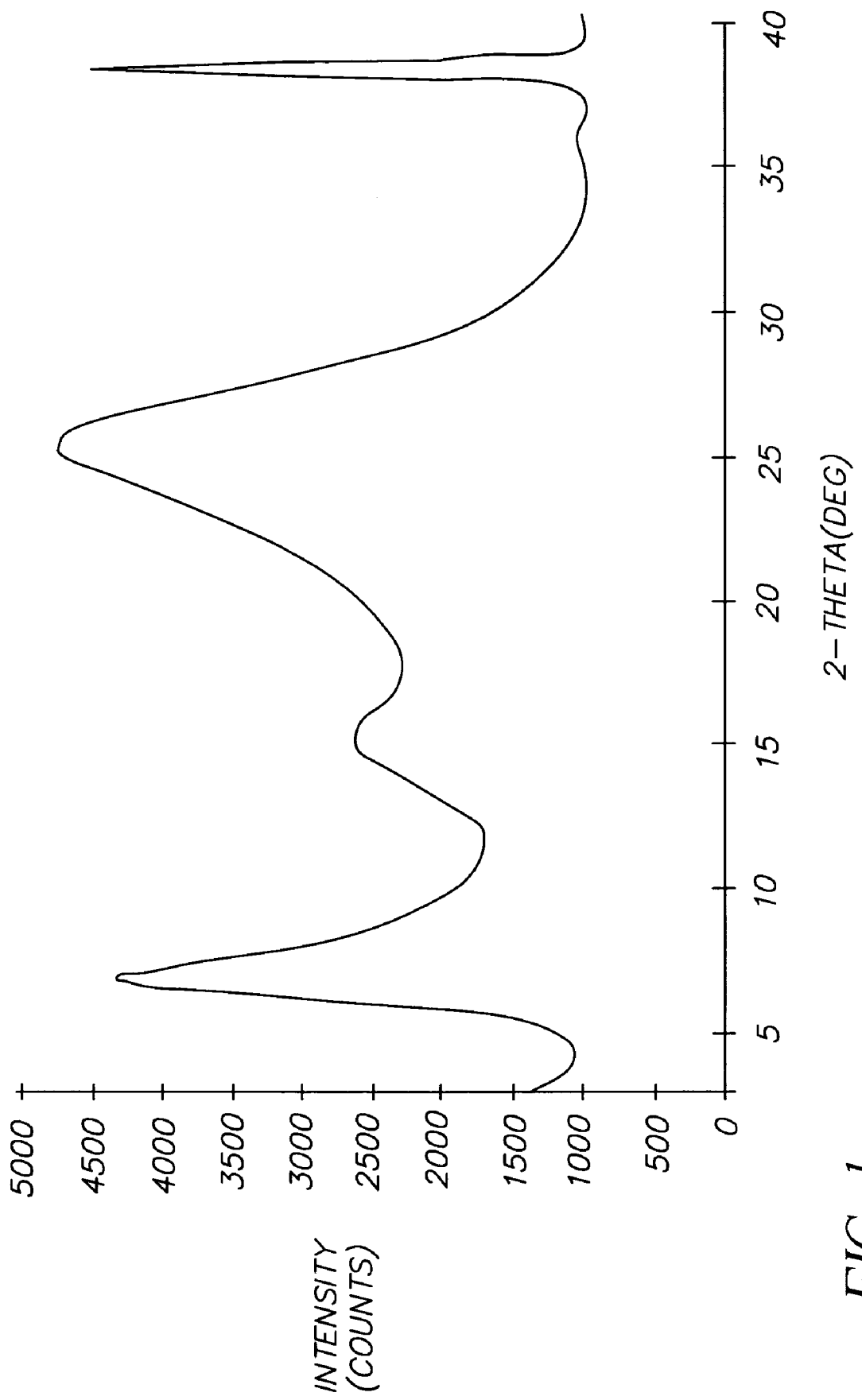
FIGS. 1–7 are X-ray diffraction spectra showing peaks of the Bragg angle 2Θ with respect to X-rays of Cu Kα at a wavelength of 1.541 Å for TiOPc and mixtures of TiOPc and TiOFPc illustrative of the invention, as follows.

Depending on its mode of preparation, crude TiOPC contains varying amounts of chlorine. "High chlorine" TiOPc may contain 0.8–1.5 wt. % chlorine. Crude "substantially chlorine-free" TiOPc is defined, for the purpose of the present invention, as TiOPc containing no more than about 0.10 wt. % chlorine.

Substantially chlorine-free TiOPc is cheaper to produce than the more highly chlorinated pigment. Furthermore, when incorporated into a cocrystalline composition of TiOPc and TiOFPc for use in the charge generation layer of an electrophotographic element, it yields more reproducible performance than the more highly chlorinated pigment. However it is difficult to directly amorphize TiOPc-TiOFPC mixtures containing more than 80 weight percent of highly crystalline, substantially chlorine-free TiOPc.

In the process of the present invention, it is important that the amorphization of the pigments in the first step be substantially complete to ensure the proper formation of the subsequently formed cocrystal. In particular, substantially complete amorphization of the initial pigment mixture breaks down the large particle size of the crude pigments and yields a cocrystal final product of desirably small particle size. In addition, because the original crystalline forms of the crude pigments, which frequently exhibit inherent dark decay characteristics, are resistant to solvent treatment following milling, their residual presence in the final cocrystal product will likely exert an undesirable effect on its dark decay performance.

Unsubstituted titanyl phthalocyanine, abbreviated throughout this application as "TiOPc", has the following structural formula:

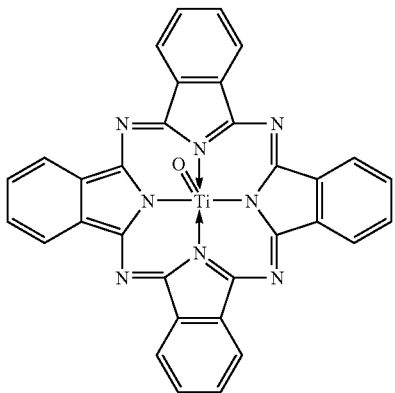

Titanyl fluorophthalocyanines, abbreviated herein as "TiFOPc", have the following structural formula:

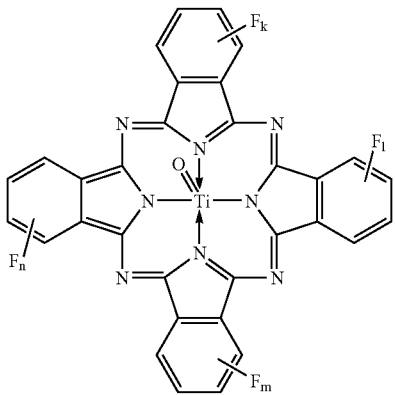

wherein each of k, l, m, and n is independently an integer from 1 to 4. In a particular embodiment of the invention, the crystalline titanyl fluorophthalocyanine is a mixture comprising titanyl 2, 9, 16, 23-tetrafluorophthalocyanine, titanyl 2, 9, 16-trifluorophthalocyanine, titanyl 2-fluorophthalocyanine, titanyl 2, 9-difluorophthalocyanine, and titanyl 2,16-difluorophthalocyanine.

The composition of the mixture and their electrophotographic properties can be manipulated through varying the weight ratio of the fluorophthalocyanines. The characteristics of the phthalocyanines combined to form the crude mixture are determined by the desired photogeneration characteristics of the final product. A preferred nanoparticulate cocrystalline composition of the present invention contains about 12.5 weight percent TiOFPc and about 87.5 weight percent of substantially chlorine-free TiOPc.

In accordance with the process of the invention, crude titanyl phthalocyanine and titanyl fluorophthalocyanine are first admixed together. The crude materials can be synthesized by a number of well-known procedures, for example, those described in the previously discussed U.S. Pat. Nos. 4,701,396 and 5,614,342. As synthesized, titanyl phthalocyanine pigments normally have a particle size that is too large for them to be effectively used in electrophotographic applications. In this condition, they are known in the art as "crude" pigments. Such crude pigments normally have a particle size in excess of 10 micrometers, often a particle size of at least 50 micrometers, and in some cases, at least 1 millimeter. The term "particle size" is used herein to refer to the largest dimension of an individual particle and the median value of the same parameter for the particles of a particulate. Particle size can be readily determined from electron photomicrographs using techniques well known to those skilled in the art.

After admixing, the crude pigment mixture is rendered amorphous. The crystallographic characteristics discussed herein, i.e., amorphousness and crystallinity, are based upon X-ray diffraction spectra at the Bragg angle 2Θ using Cu Kα X-radiation at a wavelength of 1.541 Å and are +/−0.2.degree, unless otherwise indicated. Suitable X-ray diffraction techniques are described, for example, in *Engineering Solids*, T. S. Hutchinson and D. C. Baird, John Wiley and Sons, Inc., 1963, and *X-ray Diffraction Procedures for Polycrystalline and Amorphous Materials*, 2nd Ed., John Wiley and Sons, Inc., 1974.

In the method for preparing the cocrystal product of the invention, dry milling is the preferred procedure for rendering the crude pigment mixture amorphous, although other techniques can be used. For example, the crude pigment mixture can be acid pasted or salt milled; however, these procedures have the shortcomings previously discussed.

In dry milling, the crude pigment mixture is mechanically ground in the dry state under shear conditions that break up particle agglomerates, reduce the particle size, and render the mixture less crystalline, i.e. more amorphous. It is preferred that dry milling be continued until the pigment mixture is rendered substantially or fully amorphous. The term "fully amorphous", as used herein, refers to a crystalline/amorphous state in which the well defined peaks of the crude phthalocyanine are replaced by a very high baseline response modulated by a few very broad, 5–10 degree or wider peaks.

The dry milling procedure is carried out in the substantial absence of any solvent, or polymeric binder, or salt. Milling apparatus capable of providing the necessary shear are well known and include, for example, conventional ball mills, roll mills, paint shakers, vibrating mills, and the apparatus described in U.S. Pat. No. 4,555,467 in the names of Hasegawa, et al., and U.S. Pat. No. 4,785,999 in the name of Takijiri. The shear employed is varied, as is well known to those skilled in the art, depending upon such factors as the type of milling apparatus, milling aids such as steel balls, and the crude pigment mixture used. The energy applied in the first milling stage generally does not exceed about 5 watts, and is typically from about 3 to 5 watts. Enough energy is applied to convert the crude pigment mixture to a low crystallinity pigment mixture.

The milling apparatus used during the dry milling stage may or may not require the use of particulate milling aids: materials added to the pigment particles to increase shear and decrease milling time. Particulate milling aids suitable for use in the claimed invention are materials that can be easily removed from the milled pigment mixture. For example, the salts described as milling aids in U.S. Pat. No. 5,055,368 are not desirable for use as particulate milling aids because the salts themselves are degraded to very small size by milling and must be removed by extensive washing.

Examples of preferred particulate milling aids are steel shot, ceramic, glass, and zirconia media. These aids typically are available in sizes from about 0.5 to about 5 millimeters in diameter. Typically, the concentration of the pigment mixture during milling is from about 0.5 to 25 weight percent relative to the total weight of the pigment mixture and the milling media. The dry milling time will vary greatly depending upon a number of factors such as relative proportions of pigment mixture and milling aid and the specific milling equipment used. Generally, a suitable time for the dry milling stage may be as much as 240 hours, with typical times being in the range of from about 0.5 to 120 hours.

Milling tends to result in the liberation of heat, which would raise the temperature of the milled composition. It is desirable that the milling apparatus include temperature regulating means to help maintain the temperature below the decomposition temperature of the phthalocyanine pigments, preferably in the range of about 0° C. to about 150° C., more preferably about 40° C. to about 100° C.

In a particular embodiment of the invention, the milling is performed in a Sweco Vibro Energy grinding mill manufactured by Sweco, Inc. of Florence, Ky. Stainless steel beads, 2 mm in diameter, are added as a milling media on a 90 weight/weight percent basis relative to the weight of the pigment mixture. The pigment mixture is milled for a time period of from 12 to 96 hours at temperatures within the range of 25° C. to 60° C.

The cocrystal pigment is produced by contacting the amorphous pigment mixture with an organic solvent having a $gamma_c$ hydrogen bonding parameter value less than 9.0, or preferably less than 8.0, before the pigment mixture comes into contact with any organic solvent having a $gamma_c$ hydrogen bonding parameter value greater than 9.0.

PREPARATION 1

Crude Substantially Chlorine-Free Titanyl Phthalocyanine (TiOPc)

Phthalonitrile (1280 g), benzamide (1512.5 g), xylene (1250 ml), and pentanol (1052 g) were added in that order into a 12-liter 3-necked round-bottomed flask equipped with a temperature probe and temperature controller, a condenser, and a paddle stirrer. After the stirrer was started, titanium (IV) butoxide (838 g), and xylene (1000 ml) were added. The reaction mixture was heated to reflux (144° C.) for six hours, then cooled to 85° C., and filtered through a medium frit sintered glass funnel. The pigment was rinsed first with 4×500-ml portions of toluene and then with 4×500-ml portions of hot dimethylformamide. After an overnight soak in dimethylformamide, the mixture was heated at reflux in that solvent for one hour. The product was collected and washed with methanol and acetone, then dried at 70–80° C. overnight. Neutron activation indicated 8.6+/−0.02 wt % titanium and less than 0.01 wt % chlorine.

PREPARATION 2

Crude Titanyl Tetrafluorophthalocyanine (TiOFPc)

Crude titanyl tetrafluorophthalocyanine was prepared as described in Preparation 2 of U.S. Pat. No. 5,614,342.

The crude TiOPc and TiOFPc pigments prepared as just described were employed in the following illustrative examples of the invention.

EXAMPLE 1

Figure 2:
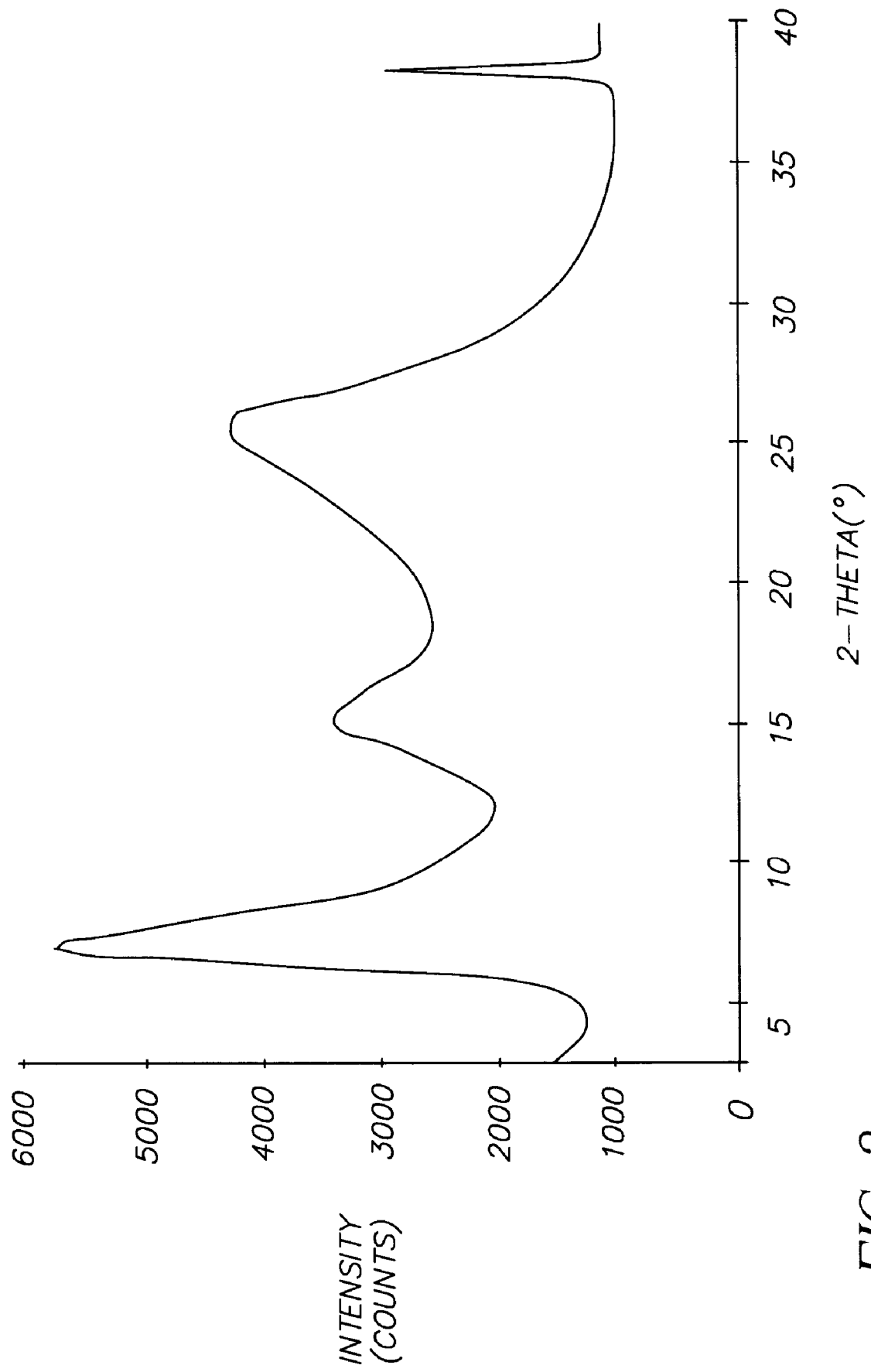
Figure 3:
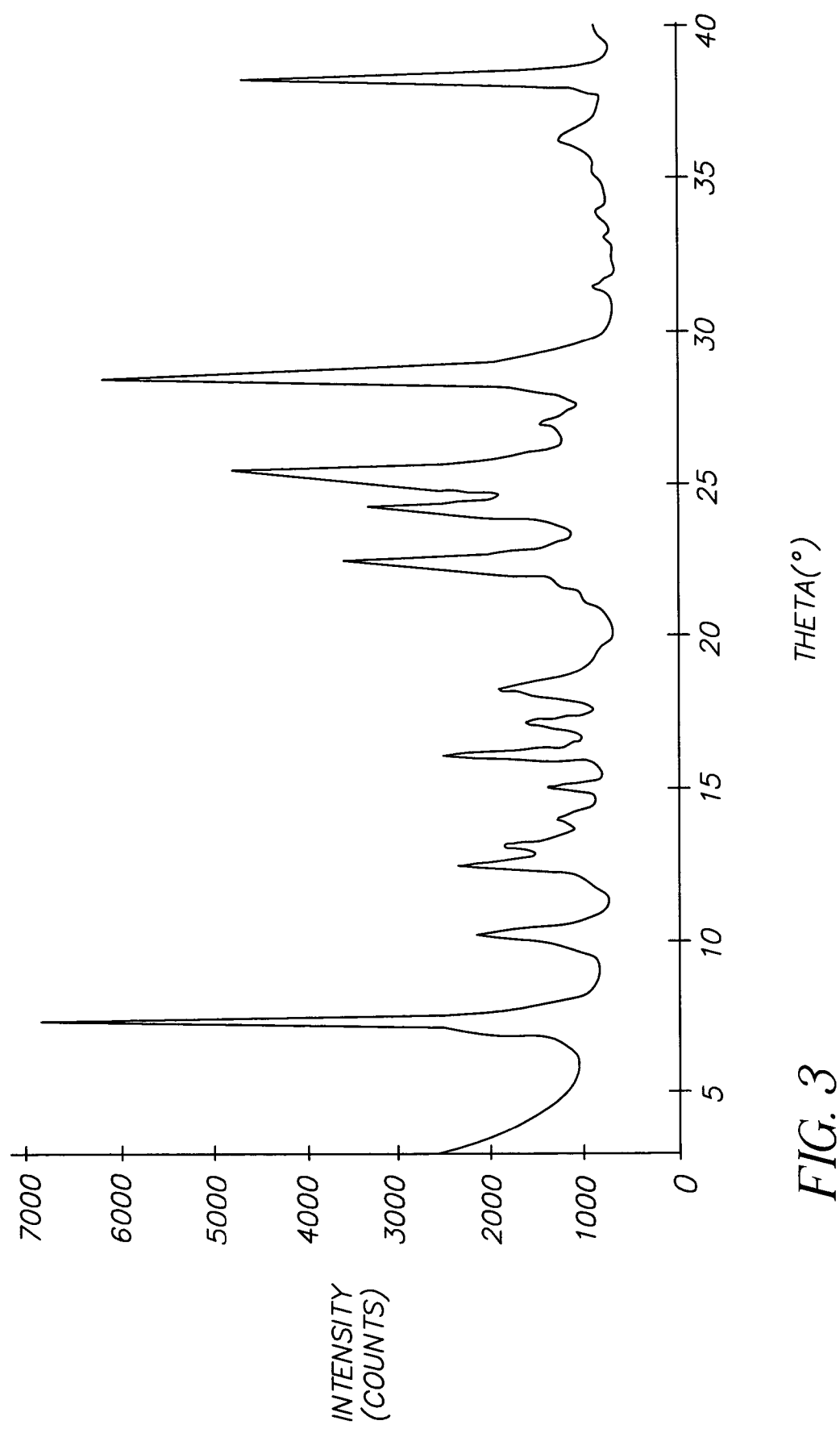

Preparation of Cocrystalline Mixture of 90/10 TIOPc/TIOFPc a) Preparation of Amorphous 60/40 TIOPc/TIOFPc—A 1-gallon-wide mouth glass jar was filled with 9 kg of 3-mm diameter stainless steel balls, 45 g of crude TiOPc of Preparation 1, and 30 g of TiOFPc of Preparation 2, then put on a roller mill at 85 rpm. After milling of the mixture for 120 hours, 1.5 liters of water was added, and the mixture was milled for another 24 hours. After removal of the steel balls, the pigment was separated and dried at 110° C. for about 4 hours. A sample of the pigment was sent for x-ray crystallographic analysis for assessment of amorphicity. In the plot of intensity vs. Bragg angle 2Θ shown in FIG. 1, the three broad peaks are characteristic of an amorphized TiOPc/TiOFPc mixture.

b) Preparation of Cocrystalline Mixture of 90/10 TiOPc/TiOFPc—A 1-gallon-wide mouth glass jar was filled with 9 kg of 3-mm diameter stainless steel balls, 56.25 g of crude TiOPc, and 18.75 g of the amorphous 60/40 TiOPc/TiOFPc (11.25 g TiOPc, 7.5 g TiOFPc), then put on a roller mill at 85 rpm. After milling of the mixture for 120 hours, a small sample was removed and treated with water, and the resulting mixture was milled for another 24 hours. The sample was separated and dried and subjected to x-ray analysis. The resulting plot, shown in FIG. 2, demonstrates that the mixture is fully amorphized. To the bulk of the sample in the jar was added 1500 ml of dichloromethane. The resulting mixture was further milled for 24 hours, after which the steel balls were separated from the pigment-dichloromethane slurry. The pigment was collected using a sintered glass filter, dried, and analyzed. The x-ray diffraction plot of FIG. 3 shows a typical pattern for a cocrystalline TiOPc/TiOFPc mixture.

EXAMPLE 2

Preparation of Cocrystalline Mixture of TiOPc/TiOFPc: 90:10

Figure 4:
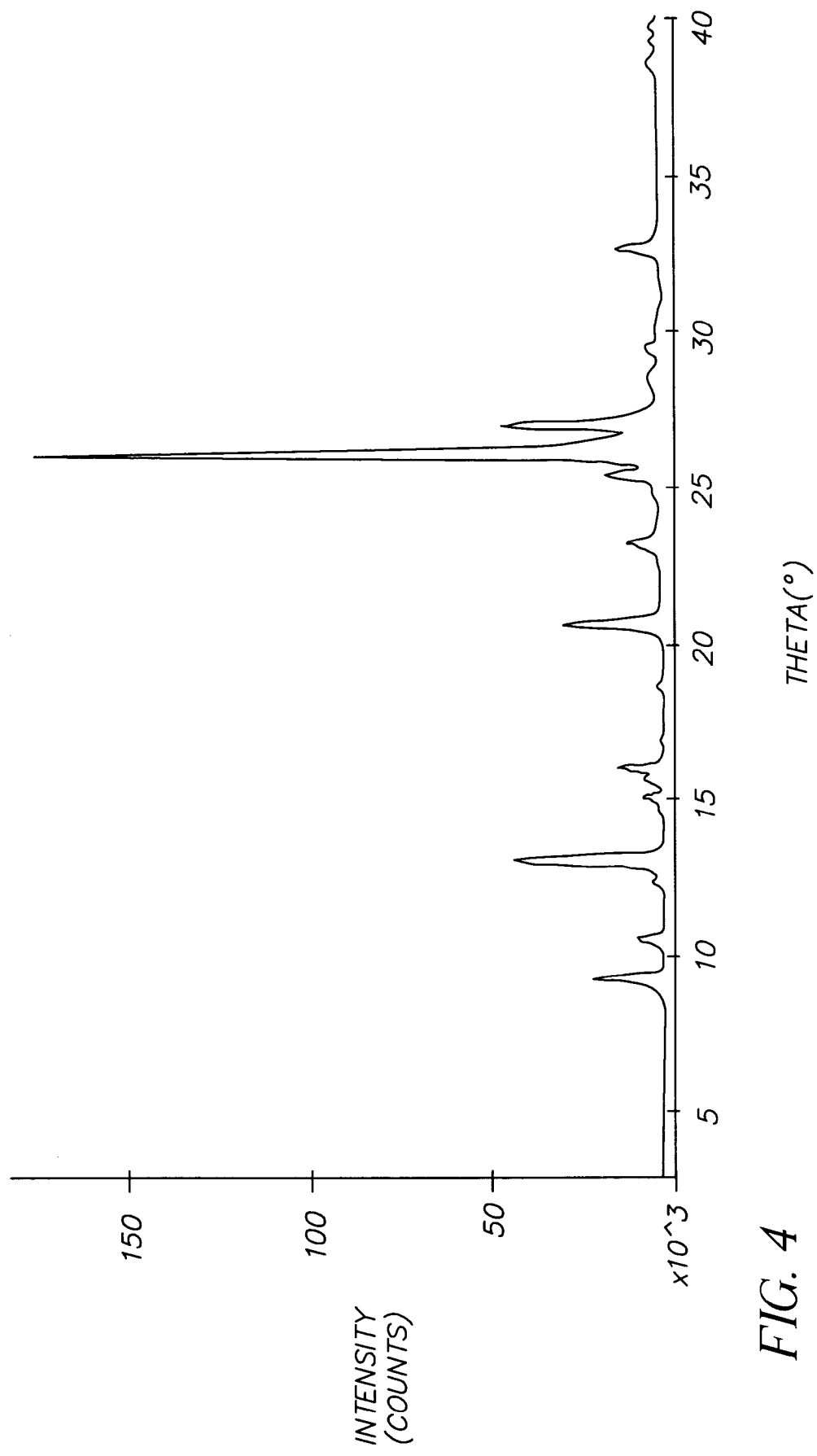

The procedure of Example 1 was repeated, except that the TiOPc employed was a highly crystalline material, obtained from the H. W. Sands Corporation, Jupiter, Fla. The x-ray diffraction plot of this material is shown in FIG. 4. Analysis shows a level of chlorine below 0.01 wt. %.

Figure 5:
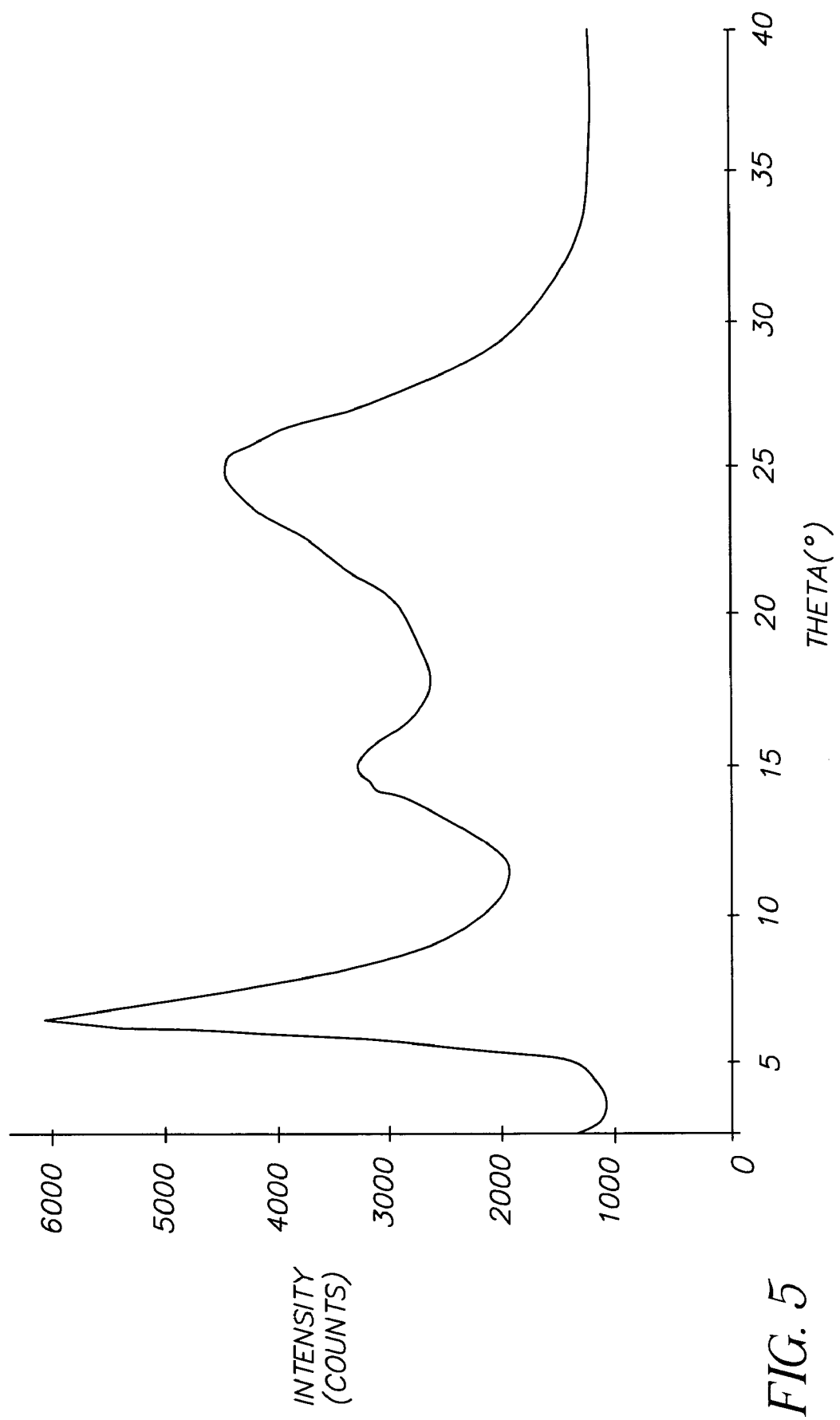
Figure 6:
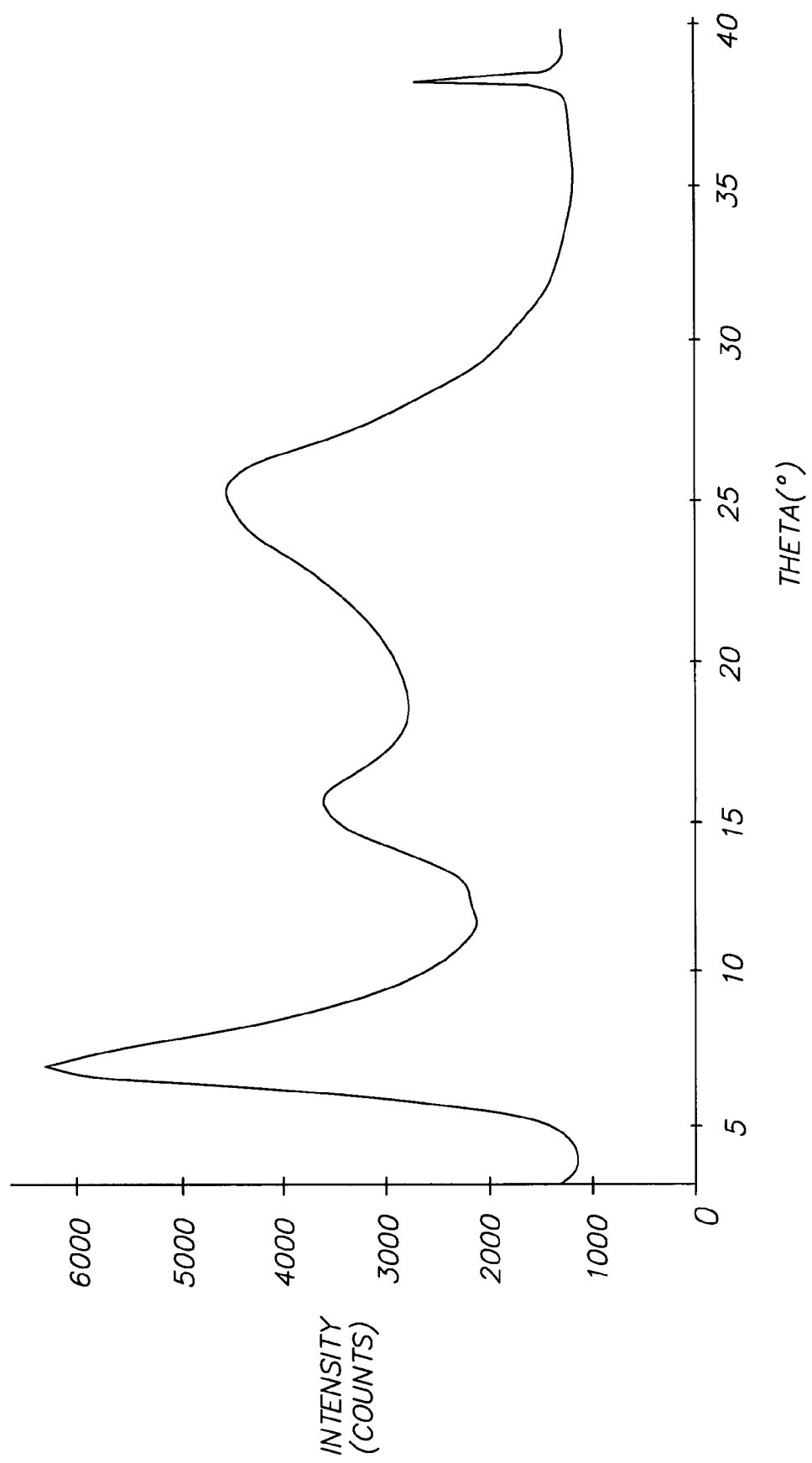
Figure 7:
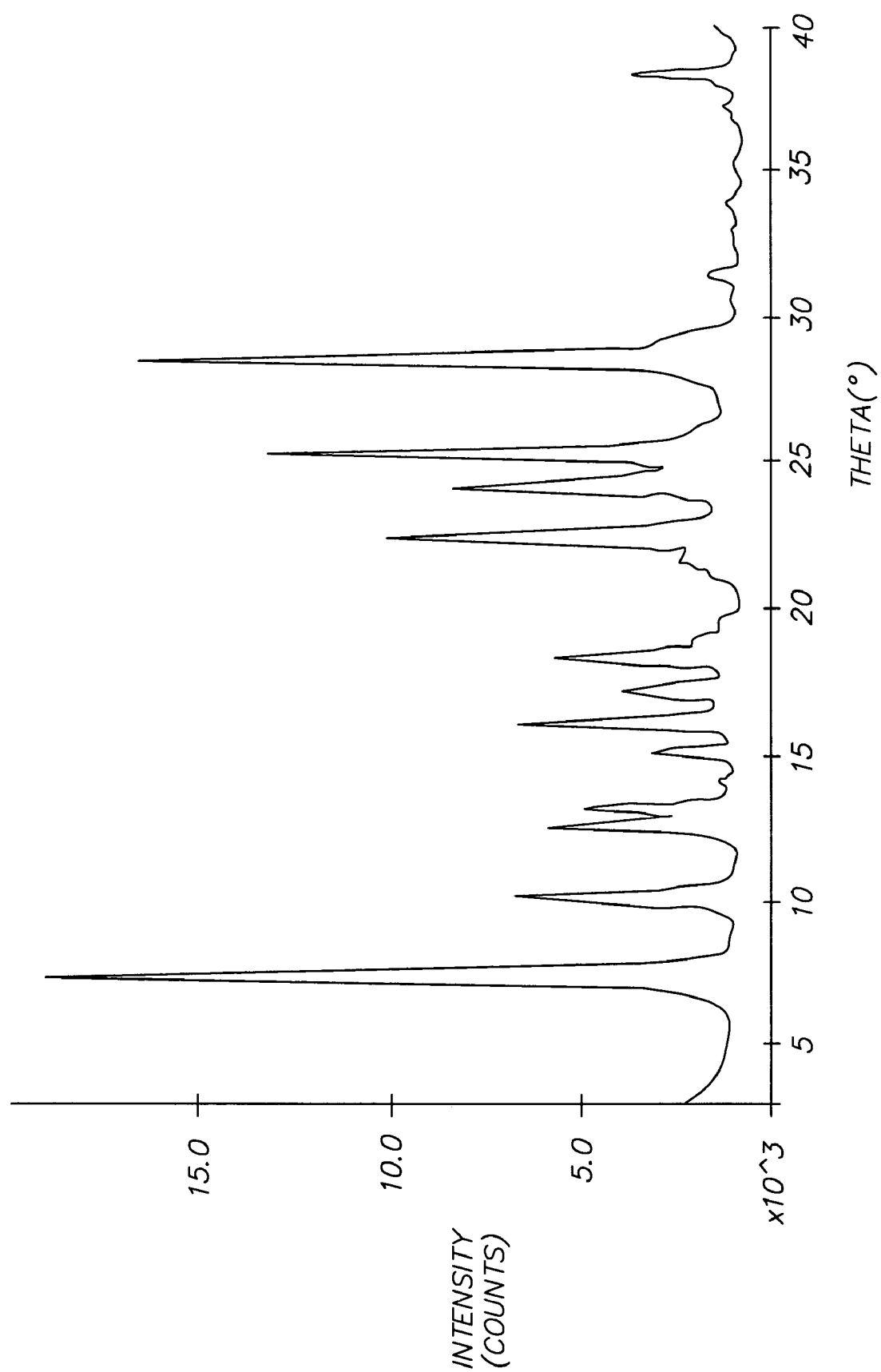

The highly crystalline material from the H. W. Sands Corporation was milled with crude TiOFPc to produce amorphous 60/40 TiOPc/TiOFPc, whose x-ray pattern is shown in FIG. 5. Milling of the amorphous 60/40 TiOPc/TiOFPc together with the Sands TiOPc yielded an amorphous 90/10 mixture of TiOPc/TiOFPc, whose x-ray pattern is depicted in FIG. 6. Further milling of amorphous 90/10 TiOPc/TiOFPc yielded a 90/10 cocrystalline TiOPc/TiOPFc having the x-ray pattern shown in FIG. 7.

The invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A process for forming an amorphous mixture consisting essentially of TiOFPc and TiOPc consisting essentially of more than 75 weight percent TiOPc, said process comprising:

forming a mixture of crude crystalline TiOFPc and crude crystalline, substantially chlorine-free TiOPc, said mixture containing less than 75 weight percent of substantially chlorine-free TiOPc;

treating said mixture under conditions effective to form a substantially amorphous mixture of TiOFPc and TiOPc containing less than 75 weight percent of substantially chlorine-free TiOPc;

treating said substantially amorphous mixture of TiOFPc and TiOPc containing more than 75 weight percent TiOPc with water;

drying said mixture so as to be substantially free of water;

following drying said mixture, adding a further amount of crude crystalline, substantially chlorine-free TiOPc sufficient to form a new mixture containing more than 75 weight percent of substantially chlorine-free TiOPc; and treating said new mixture under conditions effective to form a substantially amorphous mixture of TiOFPc and TiOPc containing more than 75 weight percent of substantially chlorine-free TiOPc.

2. The process of claim 1 wherein said conditions effective to form a substantially amorphous mixture comprises dry milling.

3. The process of claim 2 wherein said dry milling is carried out using a roll mill or a ball mill.

4. A process for forming a nanoparticulate cocrystalline composition consisting essentially of TiOFPc and TiOPc consisting essentially of more than 75 weight percent of substantially chlorine-free TiOPc, said process comprising:

forming a slurry in an organic solvent of the dried substantially amorphous mixture of TiOFPc and TiOPc of claim 1; and wet milling said slurry, thereby forming a nanoparticulate cocrystalline composition consisting essentially of TiOFPc and TiOPc and containing more than 75 weight percent of substantially chlorine-free TiOPc.

5. The process of claim 4 wherein said organic solvent has a hydrogen bonding $gamma_c$ below 9.

6. The process of claim 5 wherein said organic solvent is dichloromethane.

7. The process of claim 4 wherein said wet milling is carried out using a milling aid.

8. The process of claim 7 wherein said milling aid comprises steel balls.

9. The process of claim 4 wherein said nanoparticulate cocrystalline composition consisting essentially of TiOFPc and TiOPc contains about 15 weight percent TiOFPc and about 85 weight percent of substantially chlorine-free TiOPc.

10. The process of claim 4 wherein said nanoparticulate cocrystalline composition consisting essentially of TiOFPc and TiOPc contains about 12.5 weight percent TiOFPc and about 87.5 weight percent of substantially chlorine-free TiOPc.

11. The process of claim 4 wherein said nanoparticulate cocrystalline composition consisting essentially of TiOFPc and TiOPc contains about 10 weight percent TiOFPc and about 90 weight percent of substantially chlorine-free TiOPc.

12. The process of claim 4 wherein said nanoparticulate cocrystalline composition consisting essentially of TiOFPc and TiOPc contains about 5 weight percent TiOFPc and about 95 weight percent of substantially chlorine-free TiOPc.

13. An electrophotographic element that includes a charge generation layer comprising a nanoparticulate cocrystalline phthalocyanine pigment composition formed by the process of claim 1.

* * * * *